(12) United States Patent
Hof et al.

(10) Patent No.: US 10,635,654 B2
(45) Date of Patent: Apr. 28, 2020

(54) DATA JOURNALING FOR LARGE SOLID STATE STORAGE DEVICES WITH LOW DRAM/SRAM

(71) Applicant: SAMSUNG ELECTRONICS CO., LTD., Suwon-si, Gyeonggi-Do (KR)

(72) Inventors: Eran Hof, Ramat-Gan (IL); Michael Erlihson, Ramat-Gan (IL); Shmuel Dashevsky, Ramat-Gan (IL); Jun Jin Kong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 369 days.

(21) Appl. No.: 15/619,981

(22) Filed: Jun. 12, 2017

(65) Prior Publication Data

US 2018/0357268 A1    Dec. 13, 2018

(51) Int. Cl.
   *G06F 12/00*    (2006.01)
   *G06F 16/23*    (2019.01)
   *G06F 11/14*    (2006.01)
   *G06F 16/22*    (2019.01)

(52) U.S. Cl.
   CPC ...... *G06F 16/2358* (2019.01); *G06F 11/1471* (2013.01); *G06F 16/2255* (2019.01); *G06F 11/1469* (2013.01); *G06F 16/23* (2019.01); *G06F 2201/84* (2013.01)

(58) Field of Classification Search
   None
   See application file for complete search history.

(56) References Cited

U.S. PATENT DOCUMENTS

| 7,694,105 | B2* | 4/2010 | Sanvido | G11B 20/1803 |
| | | | | 711/161 |
| 8,296,312 | B1 | 10/2012 | Leung et al. | |
| 8,346,778 | B2 | 1/2013 | Ganesh et al. | |
| 8,407,434 | B2 | 3/2013 | Ogus et al. | |
| 8,595,248 | B2* | 11/2013 | Ganesh | G06F 16/00 |
| | | | | 707/758 |
| 8,745,316 | B2 | 6/2014 | Yin et al. | |
| 8,849,838 | B2* | 9/2014 | Wang | G06F 16/90335 |
| | | | | 707/754 |
| 8,924,663 | B2 | 12/2014 | Szczepkowski et al. | |
| 8,954,694 | B2 | 2/2015 | Tomlin et al. | |
| 9,489,296 | B1* | 11/2016 | Tomlin | G06F 12/0253 |
| 9,817,588 | B2* | 11/2017 | Chang | G06F 3/0619 |
| 10,007,619 | B2* | 6/2018 | Podaima | G06F 12/1063 |
| 10,031,763 | B1* | 7/2018 | Siebenthaler | G06F 13/4022 |
| 2009/0327589 | A1 | 12/2009 | Moshayedi | |

(Continued)

FOREIGN PATENT DOCUMENTS

JP    2016-021110    2/2016

*Primary Examiner* — John A Lane
(74) *Attorney, Agent, or Firm* — F. Chau & Associates, LLC

(57) ABSTRACT

A data journaling method in a solid state storage device, the method including: receiving a read request; determining whether updated data mapping for the read request is located in at least one of a volatile journal and a nonvolatile journal using a Bloom filter; searching the volatile journal if the updated data mapping for the request is located in the Bloom filter, and then, searching the nonvolatile journal if the updated data mapping for the request is not found in the volatile journal; and stopping the search when the updated data mapping is found.

15 Claims, 7 Drawing Sheets

(56) References Cited

U.S. PATENT DOCUMENTS

| | | | |
|---|---|---|---|
| 2011/0276744 A1 | 11/2011 | Sengupta et al. | |
| 2013/0275715 A1* | 10/2013 | Caprioli | G06F 12/10 |
| | | | 711/203 |
| 2014/0082261 A1* | 3/2014 | Cohen | G11C 16/06 |
| | | | 711/103 |
| 2014/0095765 A1 | 4/2014 | Guy et al. | |
| 2014/0195720 A1 | 7/2014 | Akella et al. | |
| 2014/0244897 A1 | 8/2014 | Goss et al. | |
| 2014/0281145 A1* | 9/2014 | Tomlin | G06F 12/0246 |
| | | | 711/103 |
| 2014/0297918 A1 | 10/2014 | Lee et al. | |
| 2014/0344934 A1* | 11/2014 | Jorgensen | G06F 21/56 |
| | | | 726/24 |
| 2015/0089123 A1 | 3/2015 | Nemazie | |
| 2016/0011789 A1* | 1/2016 | Tsuchiya | G06F 3/0608 |
| | | | 711/166 |
| 2016/0063021 A1* | 3/2016 | Morgan | G06F 16/182 |
| | | | 707/747 |
| 2016/0170842 A1* | 6/2016 | Mendez | G06F 16/128 |
| | | | 707/684 |
| 2016/0188623 A1* | 6/2016 | Finlay | G06F 16/2255 |
| | | | 707/690 |
| 2016/0224588 A1 | 8/2016 | Harijono et al. | |
| 2016/0232112 A1* | 8/2016 | Lee | G06F 13/4068 |
| 2016/0342487 A1* | 11/2016 | Ware | G11C 7/20 |
| 2017/0242583 A1* | 8/2017 | Yang | G06F 3/061 |
| 2017/0344595 A1* | 11/2017 | Subrahmanyam | G06F 16/2343 |
| 2019/0146925 A1* | 5/2019 | Li | G06F 12/10 |
| | | | 711/103 |
| 2019/0286718 A1* | 9/2019 | Norman | G06F 16/137 |

\* cited by examiner

DATA JOURNALING FOR LARGE SOLID STATE STORAGE DEVICES WITH LOW DRAM/SRAM

TECHNICAL FIELD

Exemplary embodiments of the inventive concept relate to journaling on a flash translation layer (FTL) for solid state drives (SSDs) operating with low dynamic random access memory (DRAM) or static random access memory (SRAM).

Exemplary embodiments of the inventive concept relate to journaling on a storage device. Exemplary embodiments of the inventive concept are applicable to a system without a DRAM or an SRAM.

DISCUSSION OF RELATED ART

For systems with low dynamic random access memory (DRAM) or static random access memory (SRAM), only a small part of their metadata structures can be stored in the DRAM or SRAM. The remainder of the metadata is stored on flash (in single level cell (SLC) blocks). It is to be understood that metadata can also be stored in multi level cell (MLC) or triple level cell (TLC) blocks. For convenience, the following discussion will focus on SLC. When a flash-resident metadata structure is updated (e.g., due to a host write), this update is not committed to NAND as it causes a large amount of metadata writes which may substantially degrade solid state drive (SSD) performance and may significantly increase flash block wear. Instead, this update is recorded into a RAM-resident metadata structure called a volatile journal.

When the volatile journal is full, it is written to flash (SLC blocks) to a structure referred to as an SLC journal. When the SLC journal reaches its maximum size, the flash-resident metadata structures are updated in accordance with the changes logged into the SLC journal. This process is usually referred to as a journal commit. Such hierarchical journaling is a key feature to allow the operation of large SSDs with low DRAM or SRAM. This journal-based scheme may, however, degrade SSD read performance.

SUMMARY

According to an exemplary embodiment of the inventive concept, there is provided a data journaling method in a solid state storage device, the method including: receiving a read request; determining whether updated data mapping for the read request is located in at least one of a volatile journal and a nonvolatile journal using a Bloom filter; searching the volatile journal if the updated data mapping for the request is located by the Bloom filter, and then, searching the nonvolatile journal if the updated data mapping for the request is not found in the volatile journal; and stopping the search when the updated data mapping is found.

According to an exemplary embodiment of the inventive concept, there is provided a data journaling method in a solid state storage device, the method including: receiving a read request; determining whether updated data mapping for the read request is located in a given set using a Bloom filter; and searching a metadata page if the updated data mapping for the request is not located in the Bloom filter.

According to an exemplary embodiment of the inventive concept, there is provided a data journaling method in a solid state storage device, the method including: receiving a read request; determining, when a journal commit process is taking place, whether updated data mapping for the read request is located in a given set using a first Bloom filter; and searching a volatile journal if the updated data mapping for the read request is located in the first Bloom filter.

According to an exemplary embodiment of the inventive concept, there is provided a data journal commit method in a solid state storage device, the method including: committing L2P mapping updates from a journal to a plurality of aggregation pages; committing non-L2P mapping updates from the journal to metadata pages; and committing the L2P mapping updates in the aggregation pages into L2P pages, wherein the L2P mapping updates in the aggregation pages are committed to the L2P one aggregation page at a time.

BRIEF DESCRIPTION OF THE FIGURES

The above and other features of the inventive concept will become apparent from the following description taken in conjunction with the accompanying figures in which.

DETAILED DESCRIPTION OF THE EMBODIMENTS

Figure 1:
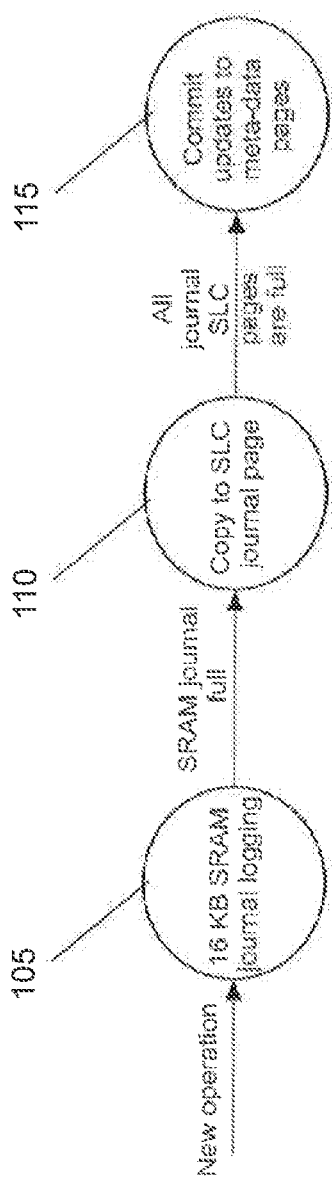
FIG. 1 illustrates a conventional journaling procedure for random access memory (RAM) limited devices.

In accordance with an exemplary embodiment of the inventive concept, there is provided a journal-based flash translation layer (FTL) that allows operating a relatively large solid state drive (SSD) with extremely limited volatile memory while minimizing performance degradation. The FTL according to an exemplary embodiment of the inventive concept is capable of reducing the cost of an SSD (due to low or zero dynamic random access memory (DRAM) cost) and making the SSD more power efficient while keeping performance high.

The FTL in accordance with an exemplary embodiment of the inventive concept can optimize SSD write/read throughput performance by using a hierarchical journaling scheme that includes an aggregation stage to minimize journal maintenance overhead for large metadata structures.

The FTL in accordance with an exemplary embodiment of the inventive concept almost eliminates the need to perform numerous flash read operations to serve a host read request by employing a method to check if journal parsing is required to fetch data required to serve the host read request.

It is to be understood that although the descriptions of the following exemplary embodiments will be made with reference to a single level cell (SLC), the inventive concept is not limited thereto. For example, other NAND pages of different capacities per cell (e.g., multi level cell (MLC), triple level cell (TLC) etc.) are applicable to the inventive concept.

As mentioned above, hierarchical journaling is an important issue. In existing schemes that use journaling, if a volatile memory is limited, the journal is small, and consequently, the journal gets filled too fast. The subsequent commit process then causes a substantial deterioration and a substantial overhead for reads and writes. However, in accordance with an exemplary embodiment of the inventive concept, we first log the journal from a volatile memory to a NAND (e.g., a SLC) journal, and then, aggregate a lot of journal data so that the commit process occurs less. Consequently, deterioration due to wear of the device and access for read and write operations drops.

Without hierarchical journaling there will be (for devices with limited DRAM/SRAM) too many journal commits operations. In other words, there will be too many updates from the journal to meta-data on NAND. With an aggregation mechanism, journaling can be done in a limited fashion to allow proper usage of the device. In a conventional aggregation, when metadata is updated it is not done, byte-by-byte, rather, a read-modify-write is performed on complete NAND pages. This is a lot of data. If you aggregate a lot of journal information, there is actually enough data to operate reasonably with a complete page. Otherwise, you read-modify-write a lot of data for a limited amount of change.

As can be seen, if you operate in a conventional aggregate fashion, reading and writing performance can be degraded. Exemplary embodiments of the inventive concept to be discussed hereinafter enable proper operation with aggregate journaling.

Hereinafter, exemplary embodiments of the inventive concept will be described with reference to the accompanying drawings.

Figure 2:
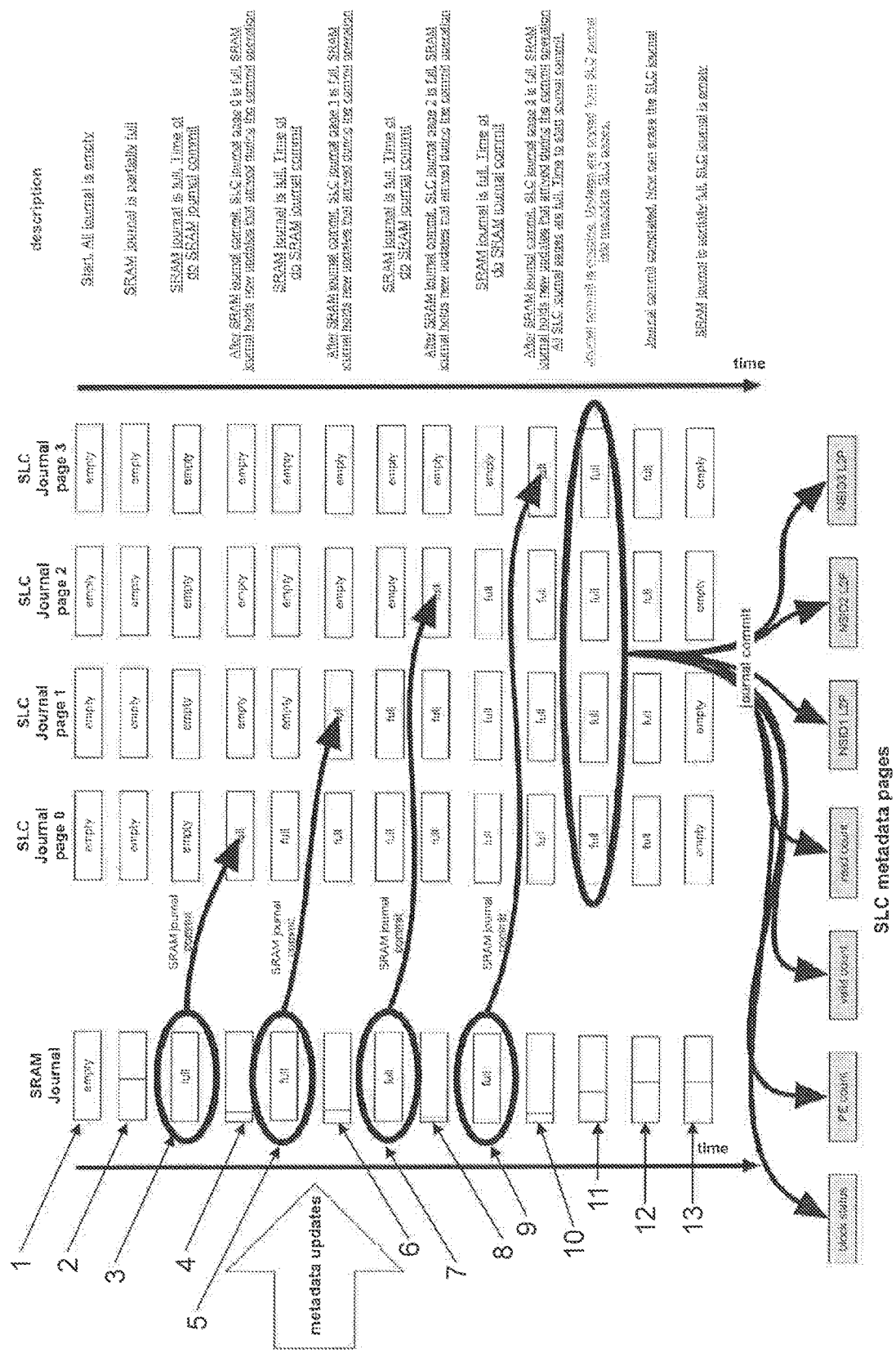
FIG. 2 illustrates the conventional journaling procedure for RAM limited devices of FIG. 1 in more detail.

First, a conventional journaling procedure for RAM limited devices will be described with reference to FIGS. 1 and 2. It is to be understood that although FIGS. 1 and 2 show the inventive concept applied to an SRAM device, the inventive concept is not limited thereto. For example, the inventive concept is applicable to DRAMs.

In SSDs with limited RAM, most metadata structures are kept only on NAND. The following metadata structures may be stored on NAND: logical-to-physical (L2P) mapping tables, block status, program erase (PE) count, valid count and read count, for example. Metadata updates are buffered in a journaling manner. Due to limited RAM, the journaling is carried out in a hierarchical manner. For example, in a limited RAM journal, journaling may be performed on one SLC page at a time, or on several SLC pages at a time.

When the RAM journal is filled, it is copied to an SLC journal. Once the pages of the SLC journal are filled, a commit process takes place (e.g., corresponding dedicated metadata pages are updated in accordance with the SLC journal contents).

FIG. 1 shows an example of a device with a 16 KB SRAM and several journal pages. As shown in FIG. 1, in the event of a new operation, the 16 KB SRAM journal logs metadata updates (105). When the 16 KB SRAM journal is full its contents are copied to an SLC journal page (110). And, when all of the SLC journal pages are full, the updates are committed to their corresponding metadata pages (115). This process will now be described in greater detail with reference to FIG. 2.

In reference to FIG. 2, at the start, the SRAM journal is empty (1). As metadata is received, the SRAM journal becomes populated. For example, portions of the SRAM journal become partially full (2). Once the SRAM journal is full, a journal commit process takes place (3). In other words, the contents of the SRAM journal are written to page 0 of the SLC journal.

After the SRAM journal commit, page 0 of the SLC journal is full and the SRAM journal holds new updates that arrived during the commit operation (4). After the SRAM journal is full again, another journal commit is performed (5). Here, the contents of the SRAM journal are written to page 1 of the SLC journal. After the journal commit, page 1 of the SLC journal is full and the SRAM journal holds new updates that arrived during the commit operation (6). When the SRAM journal is full again, yet another journal commit is performed (7). After this journal commit, page 2 of the SLC journal is full and the SRAM journal holds new updates that arrived during the commit operation (8).

At (9), the SRAM journal is full and it is time to do an SRAM journal commit. After the SRAM journal commit, at (10), page 3 of the SLC journal is full and the SRAM journal holds new updates that arrived during the commit. In addition, it can be seen that all pages of the SLC journal are full in (10). Therefore, it is time to start a journal commit operation.

At (11), the journal commit is ongoing, and updates are copied from the SLC journal into metadata SLC pages. At (12), the journal commit is completed, and thus, the SLC journal can be erased. At (13), the SRAM journal is partially full and the SLC journal is empty. Therefore, the aforementioned process can be repeated.

In the conventional process described with reference to FIGS. 1 and 2, in order to serve host read requests, it is required to retrieve the requested data from its logical-to-physical (L2P) mapping. Up to date mapping may reside in three possible locations: the limited RAM journal, the SLC journal and dedicated L2P pages (after commit). However, during a read request, the FTL has no information where the most up-to-date mapping for the request at hand resides.

Thus, in order to serve read requests, all SLC and RAM journal entries should be parsed to search for an updated (and correct) mapping. Usually, however, no update to the mapping of the current read is present in the journal. In this case, the entire RAM journal and all SLC pages should be read to serve a single read request. This operation degrades read throughput.

In accordance with an exemplary embodiment of the inventive concept, a Bloom filter is designated to identify whether a host address is in the volatile journal or in the SLC journal. A Bloom filter is a space-efficient probabilistic data structure, which is used to test whether an element is a member of a set.

In accordance with an exemplary embodiment of the inventive concept, the Bloom filter indicates whether a host address mapping resides in the volatile journal or in the SLC journal (e.g., by giving a positive answer), or whether it in the L2P mapping table on the SLC (e.g., by giving a negative answer). Since only a very small portion of a host address resides in journals, in order to serve most host read requests, the volatile journal and the SLC journals do not have to be scanned. Rather, the procedure goes straight to the L2P mapping table on the SLC to retrieve the physical location of a host address.

This approach reduces the read throughput degradation dramatically. In addition, the false positive probability of the above described Bloom filter (e.g., the probability of getting a positive answer whereas a host address does not reside in the volatile and SLC journals) is kept small. In the case of a false positive, the procedure scans the volatile and SLC journals and after concluding that the host address mapping does not reside there, the mapping is retrieved from the SLC L2P mapping table.

In accordance with an exemplary embodiment of the inventive concept, the Bloom filter is kept in the volatile journal. For every recorded write journal entry, the written host address (e.g., its logical block address) is added to the Bloom filter to indicate that its up-to-date mapping resides in the journal. The Bloom filter can be used to determine whether the mapping of a read request resides in the journals.

As described above, if the answer is negative, the scheme goes to the dedicated L2P page on the SLC containing the data mapping. In other words, the journals are not parsed. If, however, the answer is positive, the RAM and/or SLC journal are parsed to determine the location of the data mapping. When a mapping is found, the parsing stops. For example, if the up-to-date mapping resides in the middle of the second SLC journal, the following steps take place. First, the RAM journal is parsed, next the first SLC journal page is read and parsed, next the second SLC journal page is read and the first half of the second SLC page is read until the mapping update is encountered. At this time, the search for the mapping stops.

If the answer was positive but no mapping was found in the journals—then this is a case of a false positive. If this occurs, the scheme goes to the dedicated L2P page on the SLC containing the data mapping. False positive probabilities in the range of $10^{-3}$ to $10^{-6}$ are achievable with practical and highly efficient hashing functions.

After an SLC journal commit process, all committed entries are removed from the Bloom filter. However, if new entries are written during the commits, some entries are committed and some are not. This is so, because a subset of entries cannot be removed from the Bloom filter. The Bloom filter can only be reset to the all-zero state. Accordingly, the present inventive concept teaches how to use two Bloom filters, e.g., a regular Bloom filter and a commit Bloom filter, to alleviate the issue of removing committed entries from the Bloom filter. Hereinafter, the regular Bloom filter may be referred to as Regular_BF and the commit Bloom filter may be referred to as Commit_BF.

Figure 3:
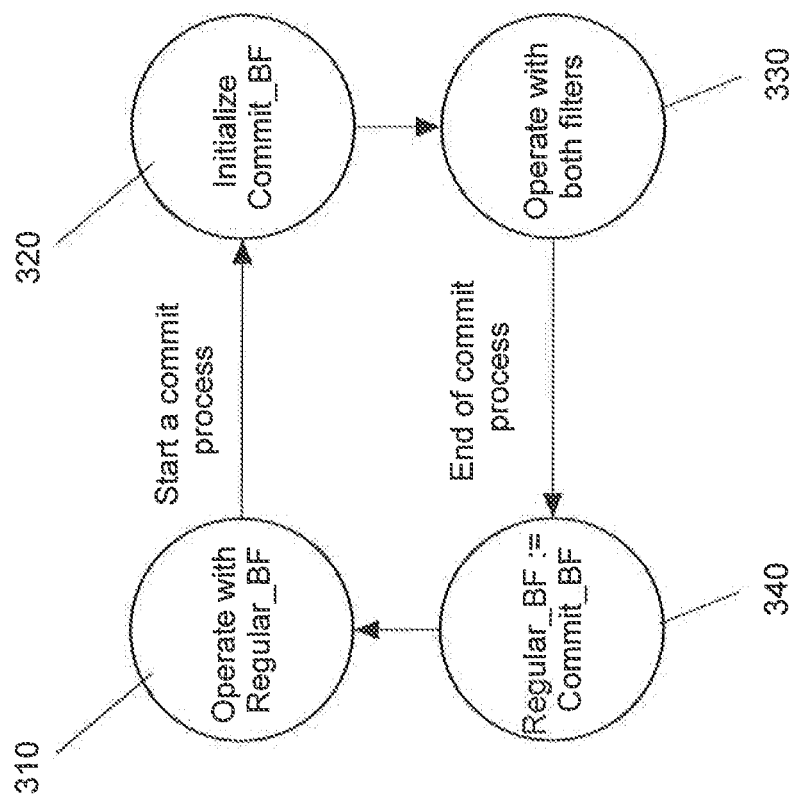
FIG. 3 illustrates a method of using two Bloom filters to query whether an update of some data mapping resides in RAM or a single level cell (SLC) journal, according to an exemplary embodiment of the inventive concept.

For example, in reference to FIG. 3, at normal operation time (not during SLC journal commit), the system only works (query and insert items) with the Regular_BF (310). After the SLC journal commit is started, the Regular_BF is frozen and a new empty Bloom filter, the Commit_BF, is initialized (320).

During the commit (330), new items are added only to the Commit_BF. Also during the commit (330), queries are carried out as follows: if Commit_BF is positive, mapping is in the SRAM journal; if Regular_BF is positive, mapping is in the SLC journal (now in the commit process). After the SLC journal commit is finished, Commit_BF content becomes the Regular_BF and the former Regular_BF is discarded (340).

Figure 4A:
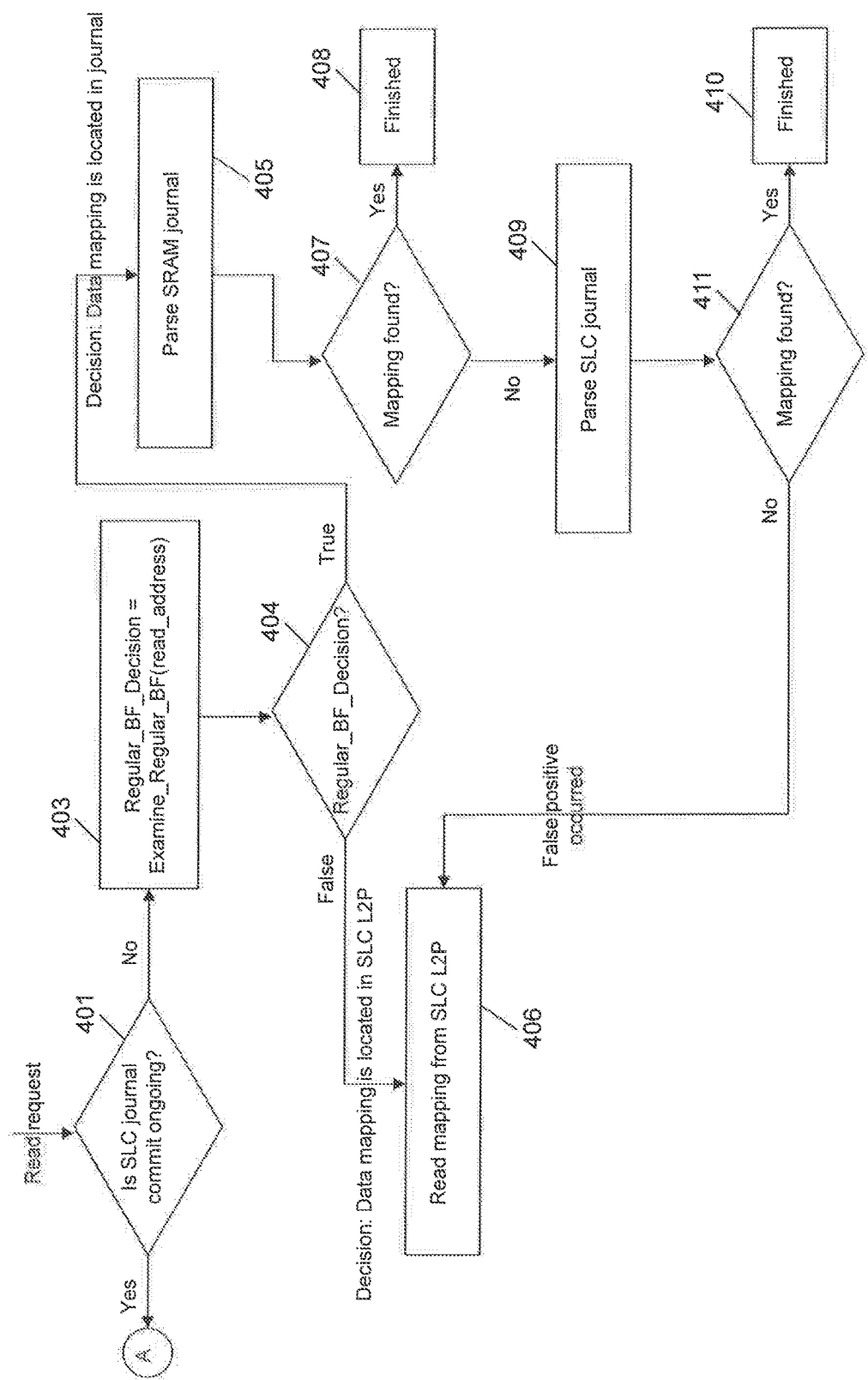
FIG. 4A illustrates a normal operating in the method of FIG. 3, according to an exemplary embodiment of the inventive concept.

FIG. 4A shows the normal operation with two Bloom filters in accordance with an exemplary embodiment of the inventive concept.

As shown in FIG. 4A, when a read request is received it is first determined if an SLC journal commit process is ongoing (401). If the SLC journal commit process is underway, the method proceeds to (402) in FIG. 4B. In other words, an operation during journal commit is performed. If the SLC journal commit process is not underway, the method proceeds to (403) in FIG. 4A. In other words, the normal operation is performed.

In the normal operation, the Regular_BF is searched to find a read address corresponding to the read request (403). If the read address is found in the Regular_BF, then it is determined that the data mapping is located in one of the journals (404—true) and the method proceeds to (405) to parse the SRAM journal. If the read address is not found in the Regular_BF, then it is determined that the data mapping is located in the SLC L2P (404—false) and the method proceeds to (406) to read the mapping from the SLC L2P.

If the mapping is found in the SRAM journal in (407), the search is stopped (408). If the mapping is not found in the SRAM journal in (407), the SLC journal is parsed (409). If the mapping is found in the SLC journal in (409), the search is stopped (410). If the mapping is not found in the SLC journal in (409), it is determined that a false positive occurred and the mapping is read from the SLC L2P (411).

In the normal operation, the single Bloom filter (e.g., the Regular_BF) indicates if the address map is in L2P pages or in the journal (e.g., SRAM or SLC pages). It is to be understood that the search is for the newest update. For example, when parsing SLC pages, the method starts from the newest page, and once the mapping is found, the method stops.

Figure 4B:
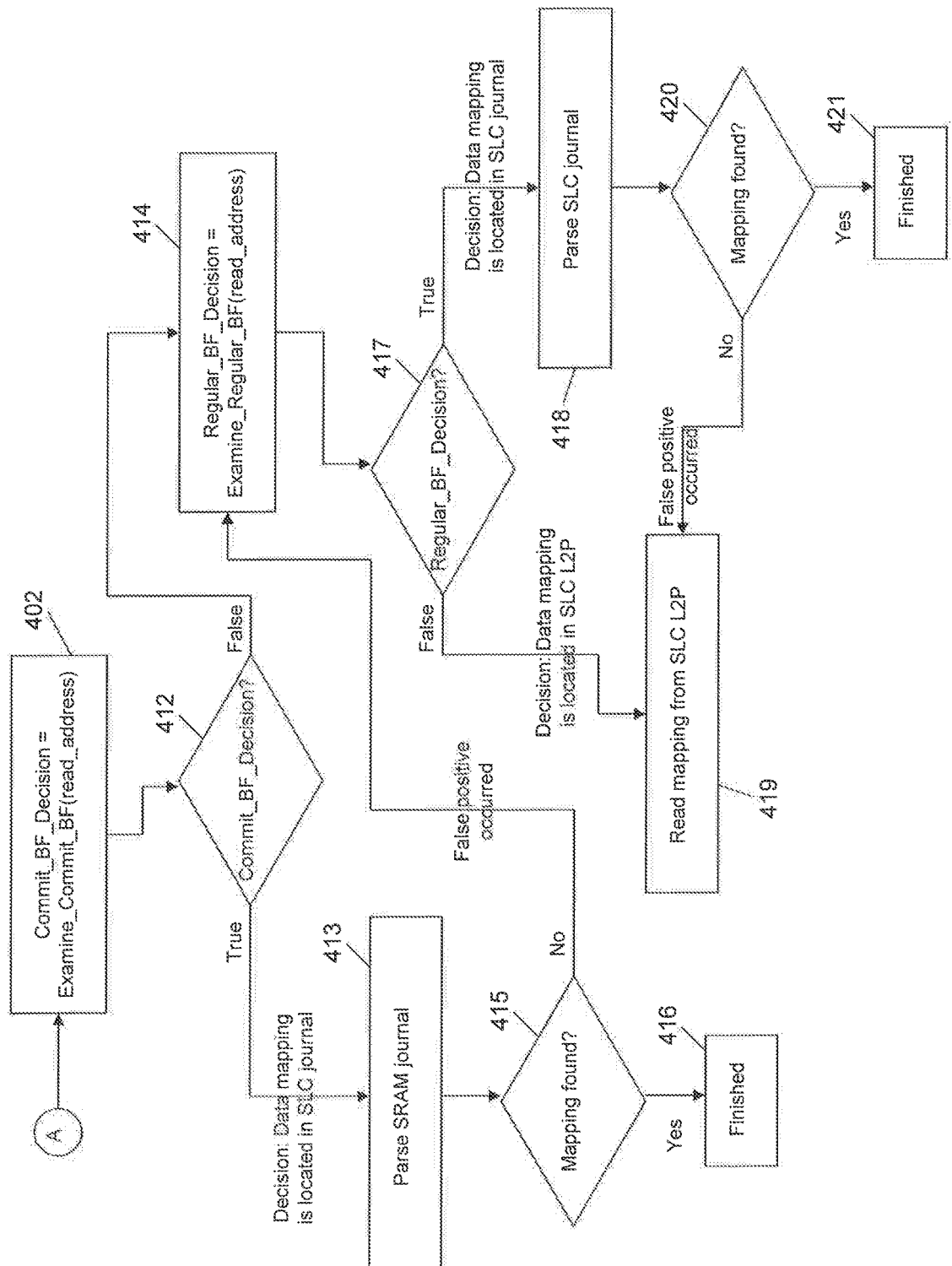
FIG. 4B illustrates an operation during journal commit in the method of FIG. 3, according to an exemplary embodiment of the inventive concept.

FIG. 4B illustrates an operation during journal commit in the method of FIG. 3, according to an exemplary embodiment of the inventive concept.

As shown in FIG. 4B, if the SLC journal commit process is underway, an operation during journal commit is performed. For example, the Commit_BF is searched to find a read address corresponding to the read request (402). If the read address is found in the Commit_BF, then it is determined that the data mapping is located in the SLC journal (412—true) and the method proceeds to (413) to parse the SRAM journal. If the read address is not found in the Commit_BF (412—false), then the Regular_BF is searched to find a read address corresponding to the read request (414).

If the mapping is found in the SRAM journal in (415), the search is stopped (416). If the mapping is not found in the SRAM journal in (415), it is determined that a false positive occurred and the Regular_BF is searched to find a read address corresponding to the read request (414).

If the read address is found in the Regular_BF, then it is determined that the data mapping is located in the SLC journal (417—true) and the method proceeds to (418) to parse the SLC journal. If the mapping is found in the SLC journal in (420), the search is stopped (421). If the mapping is not found in the SLC journal in (420), it is determined that a false positive occurred and the mapping is read from the SLC L2P (419). If the read address is not found in the Regular_BF, then it is determined that the data mapping is located in the SLC L2P (417—false) and the method proceeds to (419) to read the mapping from the SLC L2P.

As shown in FIG. 4B, the method starts with the Commit_BF because it holds the newest updates. In other words, the flow is built on the principle of starting searching from the newest updates in the journal and going on to the older updates.

For large metadata structures (occupying many SLC pages), the direct SLC journal commit may cause updates (e.g., writes) of numerous pages while only a few entries in each page are actually updated. For example, if the L2P mapping table occupies thousands of SLC pages, the journal commit may cause writing of thousands of SLC pages which may cause serious performance degradation.

Figure 5:
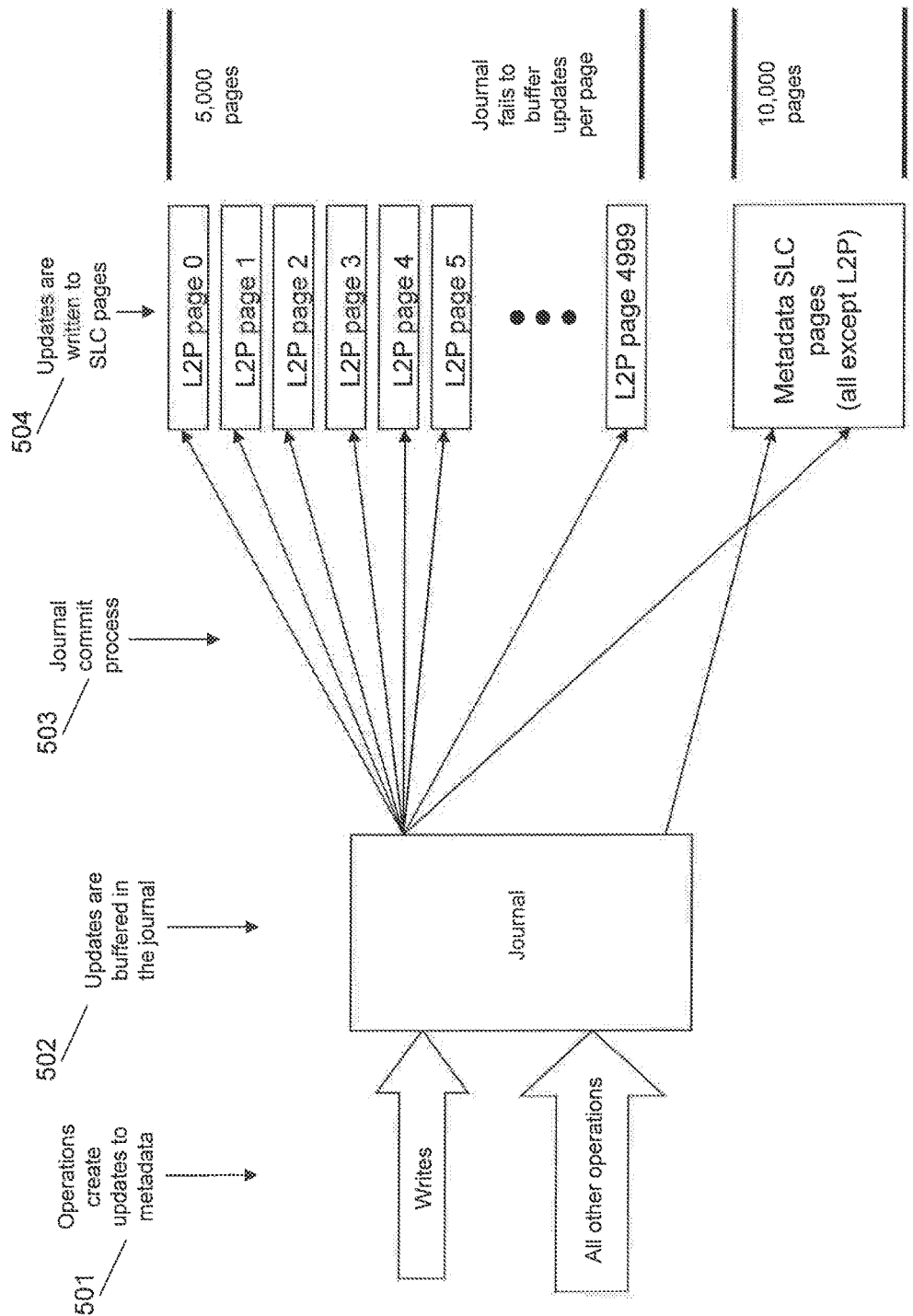
FIG. 5 illustrates a conventional journal commit procedure.

For example, in reference to FIG. 5, writes and other operations create updates to metadata (501). These updates are buffered in a journal (502), for example, an SLC journal. After the journal is full the journal commit process takes place (503). Therefore, the updates are written to the SLC pages (504).

A typical journal can hold about 5,000 to 10,000 write updates. In a multi-tier RAM limited L2P storage, a similar number of SLC pages are used for L2P storage. For example, in FIG. 5, 5,000 L2P pages (L2P page 0-L2P page 4999) are used to store 5,000 updates provided from the journal.

Consider, for example, the case of a workload that consists of writes to dispersed addresses. In other words, a random workload. At the conventional journal commit shown in FIG. 5, most L2P pages are rewritten due to only a single update from the journal. This means that an extra SLC write is performed for every write. However, this can lead to increased wearing of the NAND and substantial deterioration of throughput.

In accordance with an exemplary embodiment of the inventive concept, there is provided a procedure herein referred to as aggregation to reduce the overhead of a journal commit for large metadata structures by adding an additional buffer between the journal and the SLC L2P pages. This buffer will herein be referred to as aggregation pages (APs). Each AP covers a different part or type of the metadata structure pages, e.g., the first AP may contain all updates for pages [0:100] of the metadata structure, the second AP may contain all updates for pages [101:200] and so on. The APs are stored in the SLC.

Figure 6:
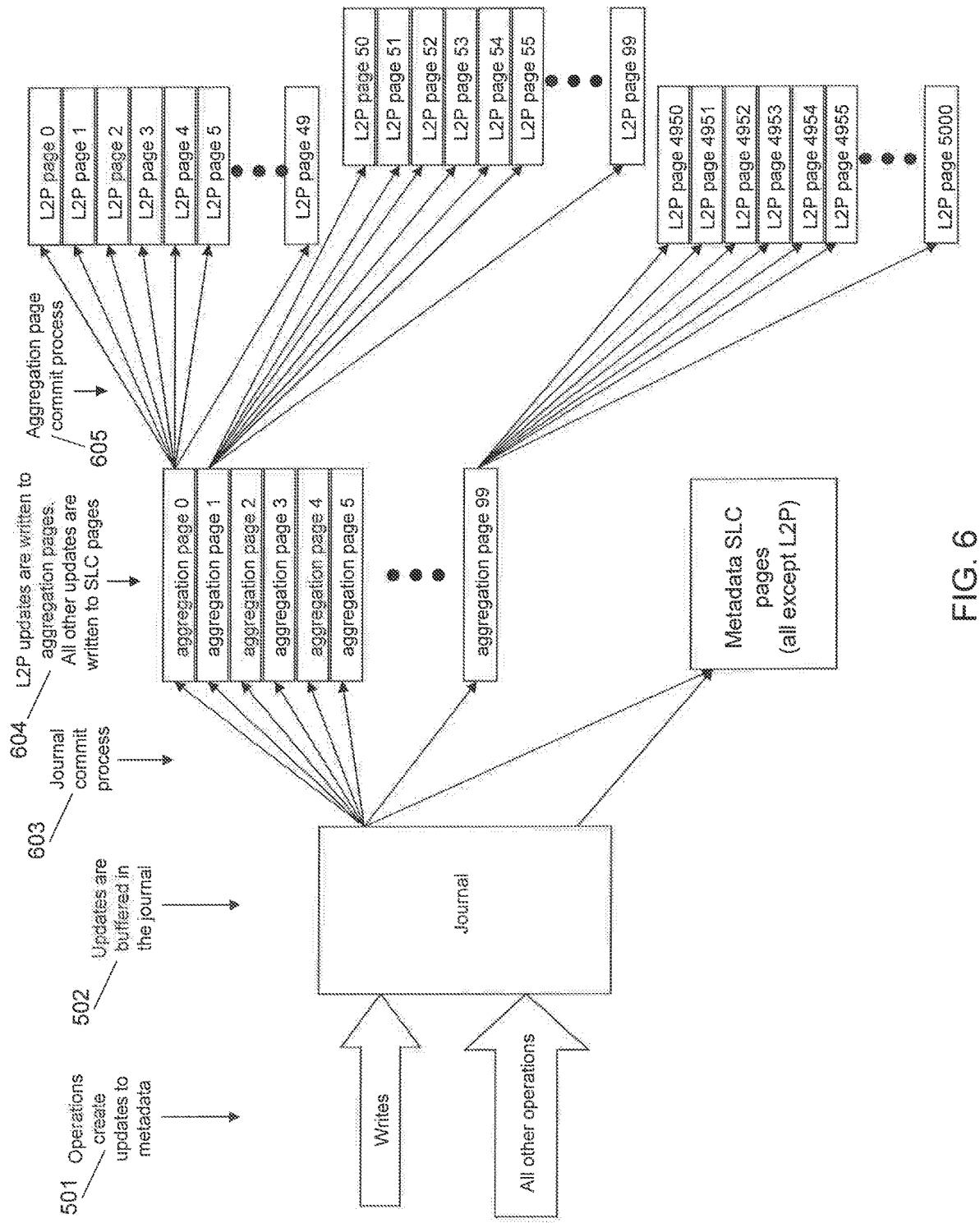
FIG. 6 illustrates a journal commit procedure, according to an exemplary embodiment of the inventive concept.

FIG. 6 shows the aggregation procedure according to an exemplary embodiment of the inventive concept. For example, in the journal commit process (603), the entire journal is committed at once. More specifically, the L2P updates are written to the aggregation pages 0-99 (604). All other updates are written to the metadata SLC pages (604). In FIG. 6, about 100 aggregation pages are defined. Each one is a buffer for 50 consecutive pages of L2P (although the exact ratio is manageable given a target performance optimization). It is to be understood that the aggregation pages are not just a buffer, they also allow for highly efficient map queries as will be detailed later.

As further shown in FIG. 6, at journal commit, each update to the L2P map is written to the aggregation page that corresponds to the considered L2P page. If the process fails to find an allowable location in the aggregation page for some mapping, this means that the aggregation page is full. In this case, the all of the updates that correspond to a single L2P page are committed from the aggregation page (605). In other words, the aggregation page commits into one L2P page at a time.

Updates in the AP are organized in a way that reduces dramatically the search overhead of a desired mapping. For this, a cuckoo hash based scheme is used to limit the possible locations of a host address with an AP; only a few (e.g., four) locations are allowed to store each host address update. This means that a maximum of four queries are required to determine whether a certain host address mapping is in the AP and to retrieve the host address mapping. It is to be understood that the number of locations is not limited to four. For example, the number of locations is tunable given a target performance optimization. Furthermore, there may be provided a small auxiliary table within the AP to store several mappings for which allowable locations were not found. This, for example, allows one to limit the worse case insertion.

For each host address mapping update committed from the SLC journal into the AP, the system computes its possible locations with the AP and checks if there is a free location among them. If yes, the host address update is inserted into this location; otherwise, it evicts one of them and the evicted entry is attempted to be inserted into the hash table. If the number of evicted entries reaches a predefined threshold, a hash table insertion fail is declared and the last evicted entry is attempted to be inserted into the auxiliary table. If the auxiliary table if full, the AP is declared to be full.

Once the AP is full (e.g., AP insertion failed), its updates are committed into the metadata pages it covers. Since each AP may cover several dozens of metadata pages, the AP commit procedure may cause read/modify/write of dozens of pages which may degrade the SSD performance substantially. To alleviate this degradation, only updates for a small set of metadata pages are committed. All metadata pages from this set are read, modified and written to SLC in accordance with the updates recorded in the AP. The updates committed into the metadata pages are removed from the committed AP (from the cuckoo-hash table or from the side table) and the updated AP is written to NAND. Updates for several metadata pages containing the largest number of updates in the committed AP are removed to free a maximal space within the AP page. Each AP may also contain a counter for a number of updates for each metadata page covered by that AP. These counters may be exploited to identify the metadata pages with the largest number of updates within a committed AP.

For small metadata structures, the SLC journal pages are committed straight to their metadata pages on flash.

Hierarchical journaling and commit described above in accordance with exemplary embodiments of the inventive concept can be summarized as follows:

1. Record each performed flash operation into a volatile journal.

2. Once the volatile journal is full, write it to flash (SLC journal) as it. The SLC journal usually contains several pages.

3. Once the SLC journal is full:

A. For small metadata structures commit their updates directly without aggregation.

B. For each large metadata structure, start aggregation.

C. Once the AP is full, commit part of its content into the set of metadata pages it covers.

While the inventive concept has been described with reference to exemplary embodiments thereof, it will be apparent to those skilled in the art that various changes and modifications may be made thereto without departing from the spirit and scope of the inventive concept as defined by the attached claims.

What is claimed is:

1. A data journaling method in a solid state storage device, the method comprising:
   receiving a read request;
   determining if a journal commit process is taking place;
   determining, when the journal commit process is taking place, whether updated data mapping for the read request is located in at least one of a volatile journal and nonvolatile journal using a Bloom filter;
   searching the volatile journal if the updated data mapping for the request is located by the Bloom filter and then, searching the nonvolatile journal if the updated data mapping for the request is not found in the volatile journal; and stopping the search when the updated data mapping is found.

2. The method of claim 1, wherein the Bloom filter is stored in volatile memory.

3. The method of claim 2, wherein the volatile memory is random access memory.

4. The method of claim 1, further comprising, for each entry written to the volatile journal, adding its write host address to the Bloom filter to indicate that its updated data mapping resides in the volatile journal or the nonvolatile journal.

5. The method of claim 1, further comprising searching a logical-to-physical mapping page on a nonvolatile metadata page for the updated data mapping when the Bloom filter returns a false positive.

6. The method of claim 5, wherein the metadata page is stored in NAND flash memory.

7. The method of claim 1, wherein prior to searching the nonvolatile journal, the method further comprises searching another Bloom filter to find a read address corresponding to the read request.

8. A data journaling method in a solid state storage device, the method comprising:
receiving a read request;
determining, when a journal commit process is taking place, whether updated data mapping for the read request is located in a given set using a Bloom filter that stores for every write journal entry, its logical block address; and
searching a metadata page if the updated data mapping for the request is not located by the Bloom filter.

9. A data journaling method in a solid state storage device, the method comprising:
receiving a read request;
determining, when a journal commit process is taking place, whether updated data mapping for the read request in located in a first dataset using a first Bloom filter; and
searching a volatile journal if the updated data mapping for the read request is located by the first Bloom filter.

10. The method of claim 9, further comprising determining whether the updated data mapping for the read request is located in a second dataset by using a second Bloom filter if the volatile journal does not contain the updated mapping for the read request, or if the first Bloom filter does not find the updated data mapping for the read request.

11. The method of claim 10, further comprising parsing a journal if the second Bloom filter finds the updated data mapping for the read request and stopping the search when the updated data mapping is found.

12. The method of claim 10, further comprising:
parsing a journal if the second Bloom filter finds the updated data mapping for the read request; and
if the updated data mapping is not found, reading the updated data mapping from a metadata page in nonvolatile memory.

13. The method of claim 10, further comprising reading the updated data mapping from a metadata page in nonvolatile memory if the second Bloom filter does not contain the updated data mapping for the read request.

14. The method of claim 9, further comprising adding new items to the first Bloom filter during the journal commit process.

15. The method of claim 9, wherein a second Bloom filter is only used when the journal commit process is not taking place, the method further comprising: after the journal commit process is finished, deleting the second Bloom filter and replacing the second Bloom filter with the first Bloom filter.

* * * * *